(12) United States Patent
Carberry et al.

(10) Patent No.: US 11,487,069 B2
(45) Date of Patent: Nov. 1, 2022

(54) LASER WELDING OF CABLE JACKET

(71) Applicant: CORNING RESEARCH & DEVELOPMENT CORPORATION, Corning, NY (US)

(72) Inventors: Joel Patrick Carberry, Big Flats, NY (US); David Wesley Chiasson, Edmonton (CA); Anping Liu, Horseheads, NY (US); Eric Raymond Logan, Huntersville, NC (US); Barada Kanta Nayak, Painted Post, NY (US); Christopher Mark Quinn, Hickory, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 17/319,668

(22) Filed: May 13, 2021

(65) Prior Publication Data
US 2021/0263250 A1 Aug. 26, 2021

Related U.S. Application Data

(63) Continuation of application No. PCT/US2019/062174, filed on Nov. 19, 2019.
(Continued)

(51) Int. Cl.
*B23K 26/262* (2014.01)
*G02B 6/44* (2006.01)
*B23K 26/21* (2014.01)

(52) U.S. Cl.
CPC ............ *G02B 6/4421* (2013.01); *B23K 26/21* (2015.10); *B23K 26/262* (2015.10); *G02B 6/443* (2013.01); *G02B 6/4434* (2013.01); *G02B 6/4436* (2013.01)

(58) Field of Classification Search
CPC ...... B23K 26/206; B23K 26/21; B23K 26/24; B23K 26/262
See application file for complete search history.

(56) References Cited

U.S. PATENT DOCUMENTS 4,304,462 A * 12/1981 Baba .................... G02B 6/4415
385/107
4,863,365 A 9/1989 Ledoux et al.
(Continued)

FOREIGN PATENT DOCUMENTS

EP 0822562 A2 2/1998
FR 2952316 A1 5/2011
(Continued)

OTHER PUBLICATIONS

International Search Report and Written Opinion of the International Searching Authority; PCT/US2019/062174; dated Jan. 30, 2020; 9 pages; European Patent Office.
(Continued)

*Primary Examiner* — Charlie Y Peng
(74) *Attorney, Agent, or Firm* — William D. Doyle

(57) ABSTRACT

An optical cable and method for forming an optical cable is provided. The cable includes a cable jacket including an inner surface defining a channel and an outer surface and also includes a plurality of optical fibers located within the channel. The cable includes a seam within the cable jacket that couples together opposing longitudinal edges of a wrapped thermoplastic sheet which forms the cable jacket and maintains the cable jacket in the wrapped configuration around the plurality of optical fibers. The method includes forming an outer cable jacket by wrapping a sheet of thermoplastic material around a plurality of optical core elements. The method includes melting together portions of thermoplastic material of opposing longitudinal edges of the
(Continued)

wrapped sheet such that a seam is formed holding the sheet of thermoplastic material in the wrapped configuration around the core elements.

20 Claims, 3 Drawing Sheets

Related U.S. Application Data

(60) Provisional application No. 62/773,592, filed on Nov. 30, 2018.

(56) References Cited

U.S. PATENT DOCUMENTS

| | | |
|---|---|---|
| 5,810,053 A | 9/1998 | Mandich |
| 6,137,934 A | 10/2000 | Consonni |
| 2004/0118590 A1 | 6/2004 | Head |
| 2004/0151448 A1 | 8/2004 | Adams et al. |
| 2005/0279737 A1 | 12/2005 | Birkeland et al. |
| 2009/0145547 A1* | 6/2009 | Clayton .............. B29C 65/1654 156/272.8 |
| 2015/0129278 A1 | 5/2015 | Li |
| 2017/0343753 A1 | 11/2017 | Bauco |

FOREIGN PATENT DOCUMENTS

| | | |
|---|---|---|
| GB | 2268635 A | 1/1994 |
| JP | 2005-246692 A | 9/2005 |

OTHER PUBLICATIONS

Coelho et al: "Modelling the spot shape influence on high-speed transmission lap welding of thermoplastics films", Optics and Lasers in Engineering, vol. 46, No. 1, 2008, pp. 55-61.

European Patent Application No. 19889426.3, Extended European Search Report dated Jul. 25, 2022; 10 pages; European Patent Office.

* cited by examiner

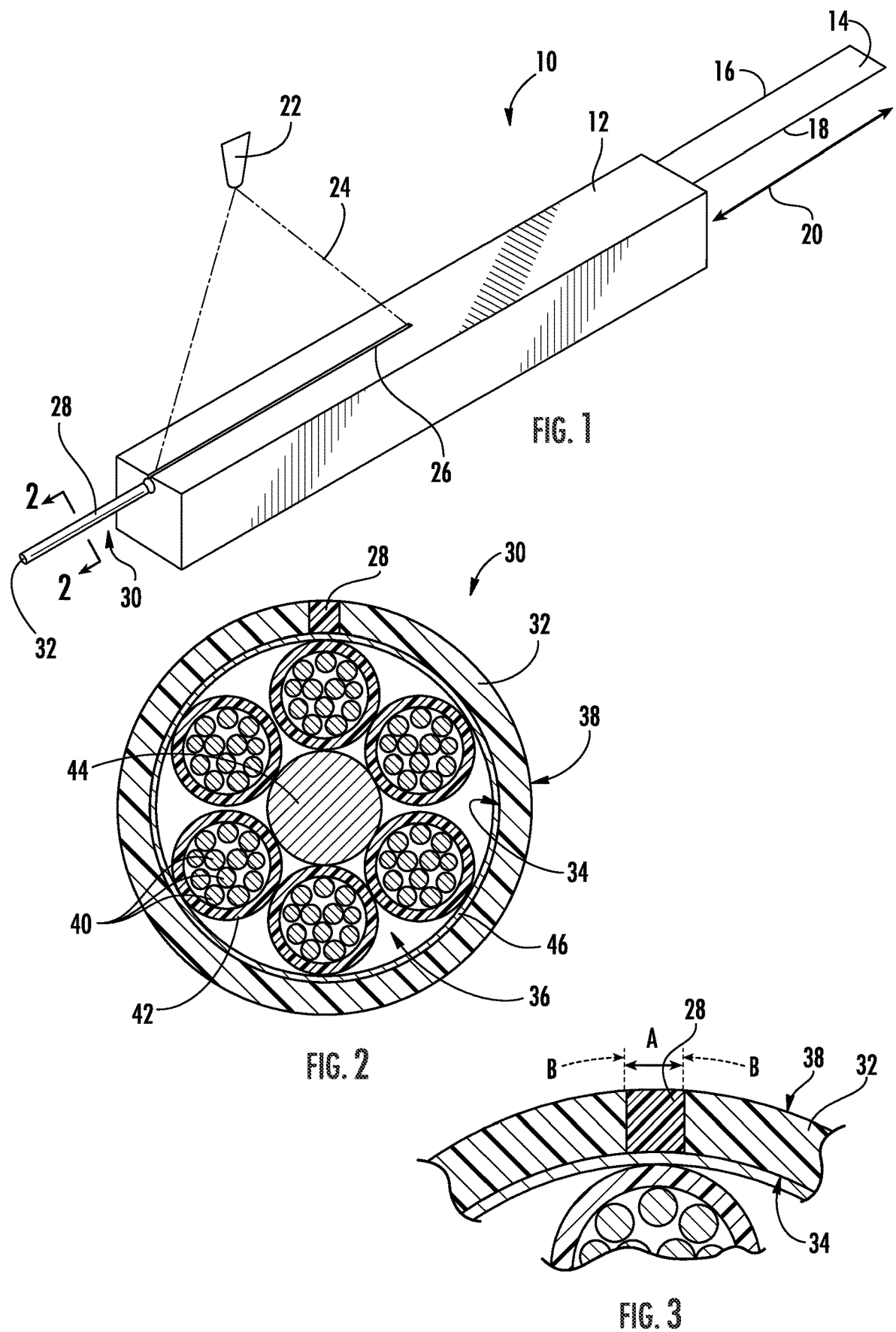

CROSS-SECTION VIEW

LASER WELDING OF CABLE JACKET

CROSS-REFERENCE TO RELATED APPLICATIONS

This application is a continuation of International Application No. PCT/US2019/062174 filed on Nov. 19, 2019, which claims the benefit of priority under 35 U.S.C. § 119 of U.S. Provisional Application Ser. No. 62/773,592 filed on Nov. 30, 2018, the content of which is relied upon and incorporated herein by reference in its entirety.

BACKGROUND

The disclosure relates generally to cables and more particularly to fiber optic cables having a wrapped and welded cable jacket. Optical cables have seen increased use in a wide variety of fields including various electronics and telecommunications fields. Optical cable jackets contain or surround one or more optical fibers. The cable jacket provides structure and protection for the optical fibers within the cable jacket.

During the manufacture of a cable sub-component or a completed optical cable, a primary challenge with extruding a molten polymer to surround a core containing optical fibers is managing the thermal shrinkage of the polymer within the extrusion process and the post extrusion shrinkage of the finished polymer profile. As cable manufacturing lines move to higher speeds, the issue surrounding thermal shrinkage of the jacket may become more severe. Excessive shrinkage within either the extrusion process or within the product post process can result in an undesirable excess fiber length within the completed cable structure. Undesirable excess fiber length can cause excessive optical bending losses with the cable products.

In an effort to remove much of the interaction between polymer processing and fiber/jacket assembly, the extrusion and assembly processes may be separated. By separating these two steps, the interaction of polymer thermal/post extrusion shrinkage with the installation of excess fiber length can be better managed to achieve the desired excess fiber length within the sub-component and/or the completed cable.

The finished polymer profiles may first be extruded and then annealed to relieve and internal stress within the profile. These profiles would then proceed to an assembly step where the profile would be formed to surround the fiber components and the profile subsequently welded to encapsulate the fiber components. The welding of the profile would be accomplished by heating just the joining region of the profile with a laser and then applying pressure to the joining region to ensure the appropriate amount of polymer molecular entanglement is achieved for the desired joint strength.

SUMMARY

One embodiment of the disclosure relates to an optical cable. The optical cable includes a plurality of optical fibers and an outer jacket. The outer jacket includes a sheet of thermoplastic material wrapped around the plurality of optical fibers such that the optical fibers are surrounded by the wrapped sheet of thermoplastic material. The outer jacket includes an outer surface of the wrapped sheet of thermoplastic material that defines the outermost surface of the cable. The cable includes a welded seam coupling together opposing longitudinal edges of the wrapped thermoplastic sheet and maintaining the outer jacket in the wrapped configuration around the plurality of optical fibers. The welded seam is formed from portions of the wrapped sheet of thermoplastic material at the opposing longitudinal edges melted together.

An additional embodiment of the disclosure relates to an optical cable. The optical cable includes a cable jacket having an inner surface defining a channel and an outer surface. The optical cable includes a plurality of optical transmission elements located within the channel and a seam extending longitudinally within the cable jacket. The seam couples together opposing longitudinal edges of a wrapped polymer sheet which forms the cable jacket and maintains the cable jacket in the wrapped configuration around the plurality of optical transmission elements.

An additional embodiment of the disclosure relates to an method of forming an optical cable. The method includes forming a cable jacket by wrapping a sheet of thermoplastic material around a plurality of optical core elements such that opposing longitudinal edges of the wrapped sheet either contact each other or overlap each other. The method includes melting together portions of thermoplastic material of the opposing longitudinal edges of the wrapped sheet such that a seam is formed holding the sheet of thermoplastic material in the wrapped configuration around the core element.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 1 shows a system for forming a wrapped and welded outer cable jacket according to an exemplary embodiment.

FIG. 2 is a cross-sectional view of an optical fiber cable according to an exemplary embodiment.

FIG. 3 is a detailed cross-sectional view of the optical fiber cable of FIG. 2 according to an exemplary embodiment.

DETAILED DESCRIPTION

Figure 4:
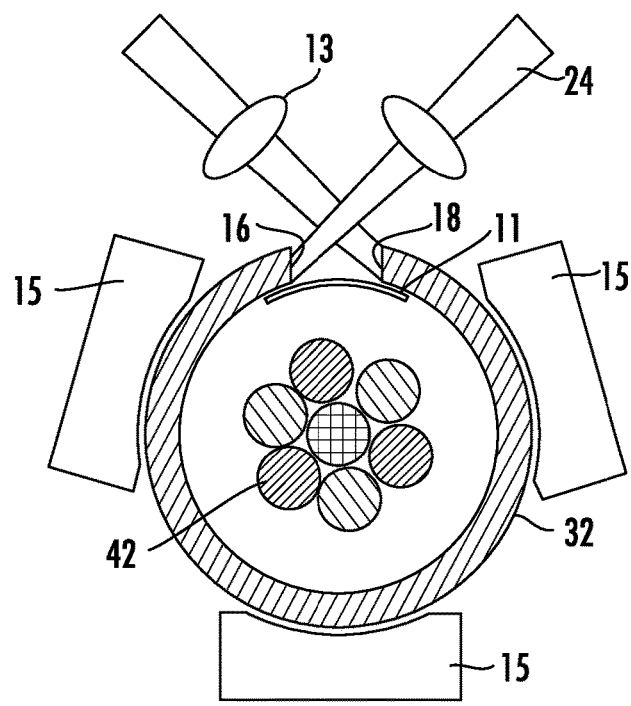
FIG. 4 is a cross-sectional view of an optical fiber cable during a jacket forming process, according to another exemplary embodiment.

Referring generally to the figures, various embodiments of an optical fiber cable and methods for making an optical fiber cable are shown. In general, the cable embodiments discussed herein include a cable jacket, e.g., an outer cable jacket, formed from a pre-extruded sheet of thermoplastic material. The outer cable jacket is formed by wrapping the thermoplastic sheet around the various optical cable core components (e.g., optical fibers, buffer tubes, strength elements, water blocking materials, armor layers, binder layers, etc.), and by then forming a seam to couple together the opposing sheet edges to hold the wrapped sheet in the desired position around the core elements. In particular embodiments, the seam is formed by a welding process (e.g., a high throughput laser welding process) that melts together the opposing sheet edges such that a circumferentially contiguous outer cable jacket is formed.

In contrast to conventional processes in which the outer cable jacket is extruded around the core components inline with the other cable assembly steps, the system of the present application is believed to enable higher throughput cable assembly through high speed wrapping and seam welding. In addition, the seam formation process discussed herein provides the ability to design and select particular seam properties. For example, in some embodiments, the seam is formed in a manner such that the seam is weaker than the surrounding areas of the cable jacket allowing the seam to operate as an easy opening feature providing easy access to the cable core components.

In addition, in specific embodiments, by utilizing a pre-extruded sheet of material to form the cable jacket, the system of the present disclosure allows for the material of the cable jacket to be cross-linked (e.g., through use of an electron beam, x-ray beam, etc.). Cross-linking is believed to increase cable jacket strength and to reduce the shrinkage experienced by the cable jacket over time as compared to conventional non-cross-linked, inline extruded cable jackets. Further, it is believed that by utilizing a pre-extruded sheet for the cable jacket, the cross-linking energy source may be applied to both major surfaces of the pre-extruded sheet prior to wrapping, providing superior levels of cross-linking.

In addition, in specific embodiments, portions of the pre-extruded sheet of cable jacket material adjacent to the longitudinal opposing edges of the sheet are left uncross-linked which facilitates welded seam formation. Further, the uncross-linked portions help form a seam that is weaker than the surrounding cross-linked portions of the cable jacket, which in turn facilitates the function of the seam discussed herein as an easy opening feature within the cable jacket.

Referring to FIG. 1, a system 10 for forming a wrapped cable jacket, such as an outer cable jacket, is shown according to an exemplary embodiment. System 10 includes a forming block 12 which receives a pre-extruded sheet 14 of polymer jacket material (e.g., a thermoplastic jacket material). Sheet 14 has opposing longitudinal edges 16 and 18 and a longitudinal axis 20.

Sheet 14 is advanced into forming block 12 in the direction of longitudinal axis 20. It will be understood that all of the other cable core components that will be surrounded by the cable jacket formed from sheet 14 are also advanced into forming block 12. Within forming block 12, sheet 14 is wrapped into around the cable core components such that a generally tubular structure is formed from sheet 14 surrounding the cable core components.

System 10 includes a laser 22 that generates a laser beam 24. Laser beam 24 is directed through opening 26 in forming block 12 toward the material of the opposing edges 16 and 18 of sheet 14 such that laser beam 24 interacts with wrapped sheet 14. Specifically, laser beam 24 melts the thermoplastic material of the portions of sheet 14 adjacent the longitudinal edges 16 and 18 together such that a seam, shown as welded seam 28, is formed. In other embodiments, other suitable devices for melt forming seam 28 may be used such as resistive heating elements, contact heating elements, etc. It is believed that in at least some embodiments, utilizing a high speed, high throughput laser device 22 may allow for formation of seam 28 and the associated cable at higher speeds than typically achieved with conventional inline jacket extrusion processes.

As shown in FIG. 1, seam 28 extends in the direction of longitudinal axis 20, and seam 28 couples together the sections of sheet 14 adjacent longitudinal edges 16 and 18 such that sheet 14 is maintained in the wrapped shaped. In various embodiments, seam 28 extends all or substantially all of the longitudinal length of cable 30, and in specific embodiments, the longitudinal length of seam 28 is greater than 10 cm, greater than 1 m, greater than 10 m, greater than 100 m, etc. In some embodiments, seam 28 is formed by bringing opposing longitudinal edges 16 and 18 together in abutting contact and then melting them together with laser beam 24. In other embodiments, a portion of sheet 14 adjacent one of the edges 16 and 18 overlaps the other opposing edge forming an overlap section, and the overlapped portions of sheet 14 are melted together forming seam 28.

In various embodiments, sheet 14 is formed from a pre-extruded sheet of thermoplastic material. In various embodiments, sheet 14 may be a variety of materials used in cable manufacturing such as polyethylene, medium density polyethylene, polyvinyl chloride (PVC), polyvinylidene difluoride (PVDF), nylon, polyester or polycarbonate and their copolymers. In addition, the material of sheet 14 may include small quantities of other materials or fillers that provide different properties to the material of sheet 14. For example, sheet 14 may include materials that provide for coloring, UV/light blocking (e.g., carbon black), burn resistance, etc.

Following formation of seam 28, optical cable 30 exits the forming block 12 having a wrapped, tubular outer cable jacket 32 surrounding the cable core elements. Referring to FIG. 2, a cross-sectional view of an optical cable 30 including a wrapped cable jacket, such as outer cable jacket 32, is shown according to an exemplary embodiment. Outer cable jacket 32 has an inner surface 34 that defines an inner passage or cavity, shown as central bore 36, and an outer surface 38 that generally defines the outermost surface of cable 30. As will be generally understood, inner surface 34 of jacket 32 defines an internal area or region within which the various cable components discussed herein are located, and jacket 32 is held in the wrapped configuration shown in FIG. 2 by the welded seam 28 joining together the opposing edges of the wrapped sheet 14. Further, while FIG. 2 shows an outer cable jacket 32 formed from sheet 14, sheet 14 can be wrapped and welded to form a variety of other thermoplastic cable layers, such as inner cable jackets, thermoplastic binding layers, etc. Applicant believes that by utilizing a pre-extruded sheet 14 (as opposed to extruding the jacket material around cable components) a higher throughput and/or lower cost process for forming an optical cable is provided.

Cable 30 includes one or more optical transmission elements or optical waveguides, shown as optical fibers 40. In the embodiment shown, groups of optical fibers 40 are located in a plurality of buffer tubes 42, and buffer tubes 42 are wrapped (e.g., in an SZ stranding pattern) around a central strength member 44. Central strength member 44 may be any suitable axial strength member, such as a glass-reinforced plastic rod, steel rod/wire, etc. Generally, cable 30 provides structure and protection to optical fibers 40 during and after installation (e.g., protection during handling, protection from elements, protection from the environment, protection from vermin, etc.). In other embodiments, the optical fibers of cable 30 are any optical fiber transmission arrangement, including tight buffered optical fibers, optical fiber ribbons, optical fiber ribbon stacks, etc.

In various embodiments, cable 30 also includes an armor layer, shown as armor 46. In general, armor 46 is formed from a strip of metal material (e.g., a metal tape, a flat elongate continuous piece of material, etc.) that is wrapped around and circumferentially surrounds buffer tubes 42. As shown in FIG. 2, armor 46 is located adjacent to the inner surface of outer jacket 32 such that these two layers are in contact with each other. In specific embodiments, armor 46 is corrugated steel tape material that is wrapped around the interior portions of cable 30, and in some such embodiments, armor 46 is longitudinally folded forming a longitudinal overlapped section where opposing edges of the tape overlap to completely surround buffer tubes 42 (and any other interior component of cable 30). In other embodiments, armor 46 may be a strip of metal tape material, helically wrapped around buffer tubes 42 such that armor 46 forms a layer circumferentially surrounding buffer tubes 42. In general, armor layer 46 provides an additional layer of protection to fibers 40 within cable 30, and may provide resistance against damage (e.g., damage caused by contact or compression during installation, damage from the elements, damage from rodents, etc.). Cable 30 may include a variety of other components or layers, such as helically wrapped binders, circumferential constrictive thin-film binders, water blocking tape materials, water-blocking fiber materials, etc.

Referring to FIG. 3, a finished seam 28 is shown in more detail. As shown in FIG. 3, seam 28 is a melt welded seam that extends the entire thickness of jacket 32 in the radial direction. In such embodiments, seam 28 extends from inner surface 34 to outer surface 38. Further, seam 28 has an arc length shown as length A, and the portion of jacket 32 outside of seam 28 has an arc length shown as B. As will be understood, arc lengths A and B together total 360 degrees. In particular embodiments, length A is a relatively small portion of the total circumference of jacket 32. In particular embodiments, length A is less than 40 degrees, specifically less than 20 degrees, more specifically less than 10 degrees and even more specifically less than 5 degrees. In various embodiments, the length B outside of seam 28 is greater than 270 degrees, specifically greater than 300 degrees, more specifically is greater than 330 degrees, and even more specifically is greater than 350 degrees.

In particular embodiments, seam 28 acts both as the coupling mechanism maintaining jacket 32 in the wrapped configuration as well as an easy opening structure within jacket 32. As will be understood, in at least some optical cable installations, jacket 32 is opened by a user to access optical fibers 40 within jacket 32, and in many conventional cable designs additional easy opening structures, such as ripcords, are located in the cable jacket to facilitate opening. In particular embodiments, rather than utilizing additional easy opening structures alone, seam 28 acts as an easy opening feature within cable jacket 32 alone or in combination with other structures such as ripcords.

In such embodiments, seam 28 is configured in such a way that the tear strength at seam 28 is less than the tear strength of jacket 32 outside of seam 28. This differential tear strength allows the user to open jacket 32 along seam 28 to access optical fibers 40. In specific embodiments, this opening is permitted without the use of cutting tools, and in certain embodiments, cable 30 does not include jacket embedded opening structures, such as ripcords, which further simplifies construction of cable 30.

Figure 5:
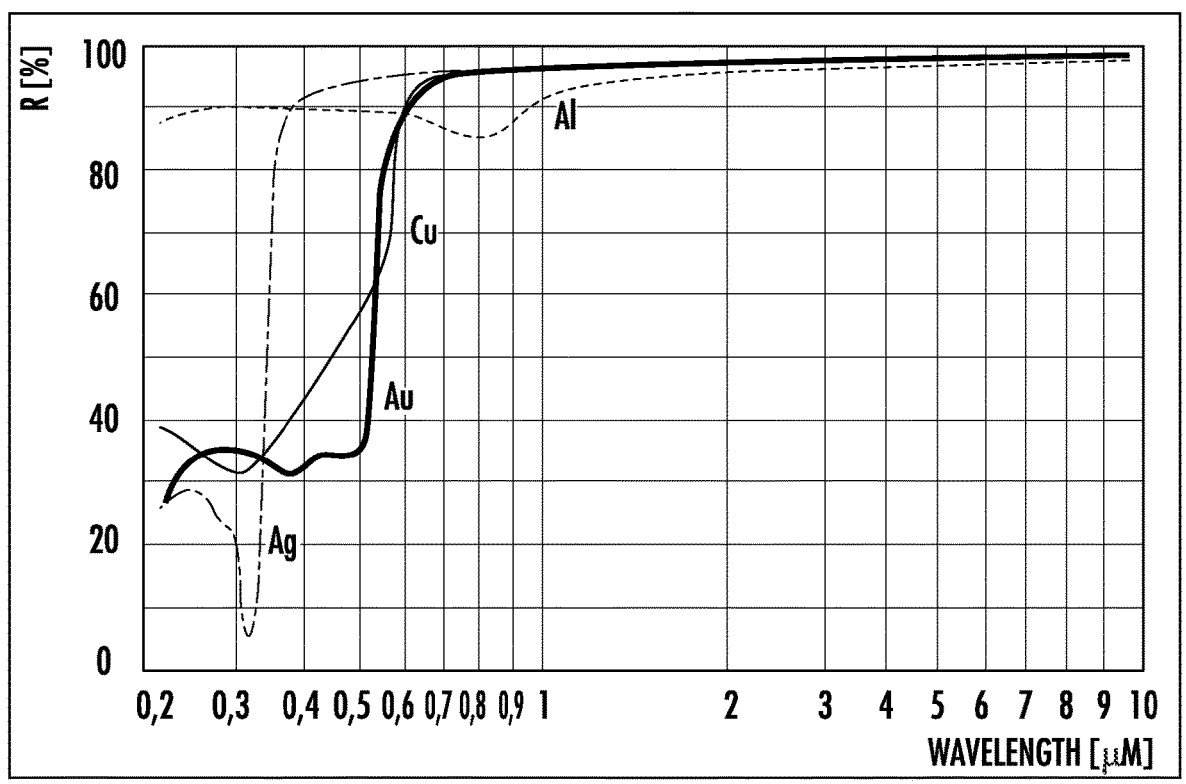
FIG. 5 is a graph detailing reflectivity of certain metal foil materials, according to an exemplary embodiment.
Figure 6:
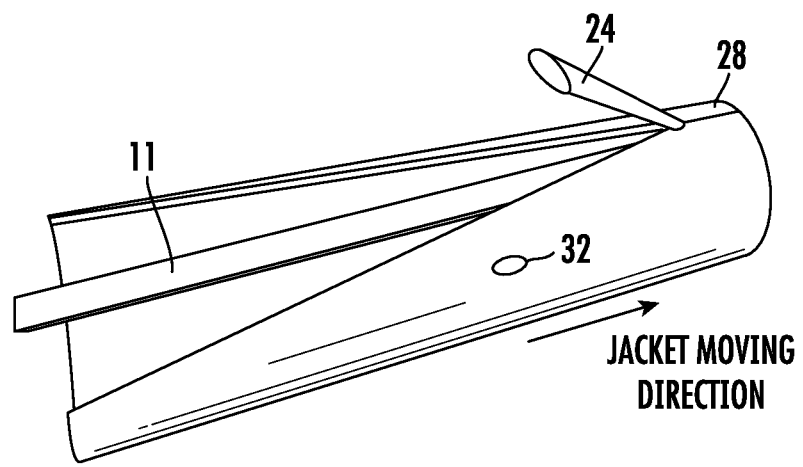
FIG. 6 shows another system for forming a wrapped and welded outer cable jacket according to an exemplary embodiment.

Referring to FIGS. 4 through 6, a laser welding process for the jacket 32 of the cable is shown in accordance with aspects of the present disclosure. As shown in FIG. 4 by just showing the jacket 32 and no core elements, at least one but preferably two laser beams 24 may be focused from opposite directions on the opposing longitudinal edges 16 and 18 of the jacket 32. The laser beams 24 quickly heat the region to a temperature suitable for welding. For example, for polyethylene based jackets, a welding temperature should be approximately 550° F., Polyethylene (PE) 550° F., for Acrylonitrile Butadiene Styrene (ABS) 500° F., for Polyvinyl Chloride (PVC) 525° F., and for Polyurethane (TPUR) 575° F.

The softened regions of the edges 16 and 18 may then then pushed together by a mechanical fixture 15, which could also be the block 12 shown in FIG. 1, during translation of the cable jacket 32 through the fixture. The edges 16 and 18 are forced together for a predetermined period of time until the edges 16 and 18 are physically jointed together and cooled down. In the setup, the laser beams 24 may be directly focused on the longitudinal edges 16 and 18 using a focusing lens. The beam size should be slightly larger than the jacket thickness. Either circular or elliptical beam can be used, but elliptical beam is preferred since it provides a longer soften region than that of the circular beam. This is particularly beneficial when the welding speed is high. The long heating region allows the edges 16 and 18 to be heated gradually while the jacket 32 is translating forward. The gradual heating may mitigate potential overheating which may lead to material liquefying or even burning.

In accordance with aspects of the present disclosure, a critical element in the welding process is a narrow strip of foil 11 below the welding region. The foil 11 may be an aluminum foil, for example. The foil provides additional protection to fibers inside the cable during the manufacturing process. Although the laser beam 24 and angle are carefully chosen to avoid direct exposure of the fibers to the laser beam 24, scattered laser beams may reach to the fiber and affect fiber properties. The foil 11 provides an inexpensive but yet very effective way to prevent the undesirable laser beam reaches to the fiber. This is because the foil 11 has very high reflectivity over a wide wavelength range. As depicted in FIG. 5, which shows reflectivity as a function of wavelength for Al, Cu, Au, Ag film coatings, aluminum provides at least 85% of reflection over a wavelength range of 300 nm to 10 um, which covers many of the laser wavelengths that may be used for jacket welding.

Figure 7:
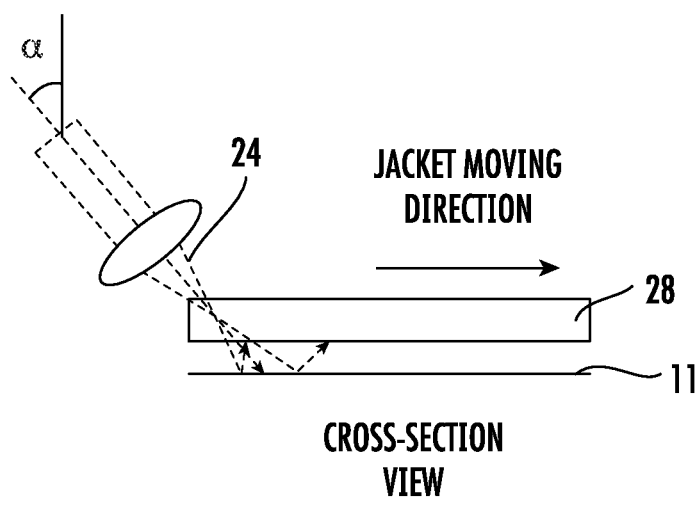
FIG. 7 is a cross-sectional view of the system of FIG. 6 according to an exemplary embodiment.

As shown in FIGS. 6 and 7, one laser beam may be used to radiate both edges 16 and 18 simultaneously to heat the bonding regions to a soften temperature. The mechanical fixture 15 follows to ensure formation of the permanent seam 28 while the cable is moving forward. In this embodiment, the foil 11 plays a critical role in protecting the core fibers from direct exposure to the higher energy laser beam. To mitigate potential damage of the foil 11 due to high power intensity, the focal point of the laser beam 24 may be positioned inside of the jacket, preferably, in the middle of the jacket. For example, for a two-millimeter thick jacket, the distance between the focal point to the foil should be at least 1 millimeter. Similar to the embodiment using the two laser beams, an elliptical beam or scanning circular beam is preferred. In addition, it's beneficial to position the angle of incidence a at an angle of 45 degrees or greater such that a larger region is exposed to the laser beam. The large angle of incident will also increase reflectivity of the foil to mitigate potential damage to the foil.

In accordance with yet other aspects of the present invention, it is desirable to maintain radial tightness of the welded jacket around the core. To assist in this during formation of the jacket 32 around the core, the jacket strip may be heated, such as by hot air or an internally supplied liquid to the forming block 12, as the tape is being formed in the forming block. The strip may be heated prior to entrance to the final closing die. The jacket strip may be heated to a temperature below the crystallization temperature to stay working in the coefficient of thermal expansion (CTE) range of the material. Thus, when the jacket strip is "formed" around the core in the final closing die it would be at an elevated temperature, such as 80° C. or greater, for example. Then, as the majority of the jacket 32 slowly cools back to room temperature or 23° C., the jacket 32 becomes tight radially.

While the specific cable embodiments discussed herein and shown in the figures relate primarily to cables that have a substantially circular cross-sectional shape defining a substantially cylindrical internal bore, in other embodiments, the cables discussed herein may have any number of cross-section shapes. For example, in various embodiments, cable jacket 32 may have an oval, elliptical, square, rectangular, triangular or other cross-sectional shape. In such embodiments, the passage or lumen of the cable may be the same shape or different shape than the shape of cable jacket 32. In some embodiments, cable jacket 32 may define more than one channel or passage. In such embodiments, the multiple channels may be of the same size and shape as each other or may each have different sizes or shapes.

The optical transmission elements discussed herein include optical fibers that may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate, and chalcogenide glasses, as well as crystalline materials, such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber. The optical transmission elements discussed herein can include a wide variety of optical fibers including multi-mode fibers, single mode fibers, bend insensitive/resistant fibers, etc. In other embodiments, the optical cables discussed herein may include multi-core optical fibers, and in this embodiment, each optical transmission element may be a single, integral optical structure having multiple optical transmission elements (e.g., multiple optical cores surrounded by cladding).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein the article "a" is intended include one or more than one component or element, and is not intended to be construed as meaning only one.

It will be apparent to those skilled in the art that various modifications and variations can be made without departing from the spirit or scope of the disclosed embodiments. Since modifications combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A method of forming an optical cable comprising:
    forming a cable jacket by wrapping a pre-extruded sheet of thermoplastic material around a plurality of optical core elements such that opposing longitudinal edges of the wrapped sheet either contact each other or overlap each other;
    using a laser beam to melt together portions of thermoplastic material of the opposing longitudinal edges of the wrapped sheet such that a seam is formed holding the sheet of thermoplastic material in the wrapped configuration around the plurality of core elements; and
    shielding the core elements from the laser beam during seam formation by providing a protection foil between the core elements and an internal surface of the cable jacket.

2. The method of claim 1, wherein the step of using a laser beam comprises directing two laser beams toward the opposing longitudinal edges of the wrapped sheet of thermoplastic material such that the thermoplastic material at the opposing longitudinal edges melts together to form the seam.

3. The method of claim 1, wherein the protection foil comprises aluminum foil.

4. The method of claim 1, wherein wrapping the sheet of thermoplastic material around the plurality of core elements includes a mechanical fixture that radially turns the opposing longitudinal edges toward one another until contact or overlap.

5. The method of claim 1, further comprising:
    heating the sheet of thermoplastic material prior to wrapping the sheet around the core elements.

6. The method of claim 5, wherein the sheet of thermoplastic material is heated to a temperature below a crystallization temperature of the thermoplastic material and stays in the coefficient of thermal expansion (CTE) range of the thermoplastic material.

7. The method of claim 6, wherein the temperature of heating is 80° C. or greater.

8. The method of claim 1, wherein the cable jacket has a wall thickness, and wherein the step of using a laser beam includes directing a focal point of the laser beam toward a middle portion of the wall thickness of the cable jacket.

9. The method of claim 8, wherein a distance between the focal point of the laser beam and the foil is at least 1 millimeter.

10. The method of claim 1, wherein the laser beam is an elliptical beam or scanning circular beam.

11. The method of claim 10, wherein an angle of incidence of the laser beam is 45 degrees or greater.

12. The method of claim 1, wherein the thermoplastic material comprises polyethylene, medium density polyethylene, polyvinyl chloride (PVC), polyvinylidene difluoride (PVDF), nylon, polyester or polycarbonate.

13. The method of claim 12, wherein the laser beam heats the portions of thermoplastic material to be melted together above 500° F.

14. The method of claim 12, wherein the thermoplastic material comprises materials for coloring, UV/light blocking, or burn resistance.

15. The method of claim 1, wherein a tear strength of the seam is less than a tear strength of the cable jacket outside of the seam.

16. The method of claim 4, wherein the mechanical device is a forming block.

17. A cable formed by the method of claim 1.

18. The cable of claim 17, wherein the seam extends an entire thickness of the cable jacket in a radial direction.

19. The cable of claim 17, wherein the seam has an arc length and a portion of the cable jacket outside of the seam has a jacket arc length, and wherein the arc length of the seam is less than 10 degrees and the jacket arc length is greater than 350 degrees.

20. The cable of claim 17, wherein the core elements comprise an armor layer.

\* \* \* \* \*